United States Patent [19]

Blake

[11] Patent Number: 4,869,526
[45] Date of Patent: Sep. 26, 1989

[54] FOLDING GOLF CART

[75] Inventor: Larry D. Blake, Ogden, Utah

[73] Assignee: Carbon Fiber Products, Inc., Ogden, Utah

[21] Appl. No.: 145,401

[22] Filed: Jan. 19, 1988

[51] Int. Cl.$^4$ .............................................. B62B 1/12
[52] U.S. Cl. .................................. 280/645; 280/652; 280/47.27; 280/DIG. 6
[58] Field of Search ............... 280/641, 645, 639, 652, 280/654, DIG. 6, 47.27, 47.24; 297/37, 16, 17

[56] References Cited

U.S. PATENT DOCUMENTS

| | | | |
|---|---|---|---|
| 4,046,394 | 9/1977 | Thompson, Jr. | 280/33.99 X |
| 4,226,467 | 10/1980 | Boudreau | 297/16 |
| 4,514,009 | 4/1985 | Vanderminden et al. | 297/16 |
| 4,679,817 | 7/1987 | Schufer | 280/47.27 X |
| 4,705,293 | 11/1987 | Hart | 280/641 |

FOREIGN PATENT DOCUMENTS

| | | | |
|---|---|---|---|
| 623169 | 6/1927 | France | 280/652 |
| 680052 | 10/1952 | United Kingdom | 280/DIG. 6 |

Primary Examiner—Charles A. Marmor
Assistant Examiner—Tamara L. Finlay
Attorney, Agent, or Firm—Dressler, Goldsmith, Shore, Sutker & Milnamow

[57] ABSTRACT

Three substantially planar structural members, preferably made of coved or channelled fiber-reinforced composite material, fold and unfold about a plurality of pivot axes each of which is parallel to the rolling axis of the cart's two quick-disconnect wheels. The wheels occupy the same spatial positions and angular orientation relative to one another in both the folded and unfolded states of the golf cart. A detachable handle is selectively clenched by actuation of a thumb screw. The cart's folded size is approximately 16"W×26"L×5"H without wheels. Each structural panel weighs approximately 1.1 lbs., and the total cart weight is typically 5 to 7 lbs.

17 Claims, 5 Drawing Sheets

FOLDING GOLF CART

BACKGROUND OF THE INVENTION

1. Field of the Invention

The present invention generally concerns wheeled golf carts that fold. The present invention particularly concerns golf carts that fold along plural axes each of which is parallel to the wheels' axis.

2. Background of the Invention

It is known to make wheeled trolleys and hand trucks, particularly including golf carts, that are foldable for ease of transport and storage. Folding golf carts are commonly made out of metal, particularly aluminum, tubing They normally fold to an elongate shape that is similar to the golf bag which the carts carry, and to which the carts often remain affixed when folded.

The most common folding golf cart design employs an elongate column member, substantially vertically disposed in the operative position of the cart, which attaches the length of the golf bag. Leg members which rotatably mount wheels at their distal ends are pivoted relative to the central column, normally by being attached near its mid-point. The column also connects a pivoting handle. In the cart's operative condition the legs are pivoted and held away from the column, thereby forming an "A" frame suspension. The column and the golf bag held thereon reside at the apex of the "A" while the two wheels reside at the legs of the "A". Also in the cart's operative condition the handle is pivoted to an extended position whereat it may be used to pull, or to push, the column and its affixed golf bag to roll upon the wheels. In the collapsed, or folded, condition of the cart the arms lie substantially parallel to the column. The wheels are sometimes pivoting, or sometimes removed, during folding in order to improve compactness. Finally, the handle pivots to a folded position lying along the column in the collapsed condition of the cart.

A folding golf cart of this predominant prior art design and construction has certain limitations. It is not normally significantly shorter than a golf bag, or approximately 40", when folded (unless it is further disassembled). Because of its elongate nature it is not as easily manipulated when folded as would be a folded object of the traditional suitcase profile.

The elongate column and leg members of the cart encounter high stress and are thus conveniently and economically subject to fabrication primarily from metals. These metals suffer adversely from corrosion in the outdoor environment in which the golf cart is used. Alternate composite or non-metallic materials of construction such as woods, plastics, fiberglass, and the like are poorly suited to prior art folding cart designs. This is because these materials are normally best formed into pivotally connectable structural members in the form of planar or solid bodies, and not as tubes or shafts. In other words, a non-metallic material can readily be used to make an elongate cylindrical member, such as a fiberglass or wood golf club shaft, but this same material is not readily machined or formed, as is metal, at its end so as to make a pivoting connection. Pivotable connections made with plastics and other non-metallic materials normally extend over large spatial regions, as witness the common live hinge of a plastic tool box. It would be desirable if corrosion-resistant lightweight non-metallic materials could be used to make a golf cart which was foldable by act of pivoting between its members while still being adequately rigid and strong in its pivot joints. The conventional "A" frame folding golf cart design is not particularly suitable for implementation in non-metallic materials.

SUMMARY OF THE INVENTION

The present invention is embodied in a golf cart that preferably folds, and in a method of constructing and folding such a cart. The preferred embodiment of a folding golf cart in accordance with the present invention has several notable advantages. Its major structural members are economically made of durable non-metallic material, typically fiberglass, graphite, or other fiber-reinforced plastic. The cart consequently exhibits strength, light weight and corrosion resistance. The cart has a geometry of construction that makes most of its mass very close to the ground while a golf bag affixed to the cart is carried close to the ground at a relatively more acute angle than is common for prior golf carts. The wheels and wheelbase of the cart are both relatively wide. Accordingly the cart and affixed golf bag jointly exhibit a very low center of gravity, imparting stability and preventing the cart from toppling over during rolling and rest. The cart folds to very compact dimensions, substantially in the aspect ratio of a small suitcase. Furthermore, the cart preferably incorporates both quick-disconnect wheels and handle for attainment of an even more compact folded profile.

The preferred embodiment of a golf cart in accordance with the present invention is made from three main structural members plus (typically) two wheels and a handle. Each of the three structural members is substantially planar, and is more particularly substantially in the shape of a trapezoid that is both (i) coved, or channeled, for strength and rigidity and (ii) apertured for weight reduction.

A first base pan member, operatively deployed during rolling and resting of the golf cart in relatively horizontal positions proximate the ground, both (i) rotatably mounts the wheels on opposite edges proximate a one side, and (ii) presents a receptacle area proximate the opposite side that is capable of receiving and retaining the base of a golf bag. A second, bag support, member, operatively deployed during rolling and resting of the golf cart in relatively vertical positions, both (i) extends upwards from an attachment near the one side of the base pan member, and (ii) presents oppositely to this attachment a bag cradle area capable of receiving and retaining an upper region of the golf bag. Finally, a third, support leg, member (i) extends between the base pan member and the bag support member and (ii) connects to each. Each of the three members is in a plane that is parallel to some plane that passes through the wheels' rolling axis. The three members connect so as to form a structural prism of triangular cross-section. The axis of this prism is substantially parallel to the wheels' rolling axis.

Still more particularly in accordance with the present invention, the golf cart made from three substantially planar structural members plus two wheels and a handle is foldable, or collapsible. Particularly, the attachment of the second bag support member to the first base pan member is selectively engagable and disengagable, more particularly by a toggle latch. Meanwhile, the connections of the third support leg member to each of the first base pan member and the second bag support member are each pivotable, typically by binder screws threading the pivoting members. By this construction the third support leg member may be pivoted relative to the first base pan member, and relative to the second bag support member, while the second leg support member is disengaged from the first base pan member.

The preferred method of a scissors- or jackknife-type "Z" folding of the golf cart in accordance with the present invention is notable in several aspects. The golf cart frame comprised substantially of substantially planar members both folds and unfolds about a plurality of pivot axes all of which are substantially parallel to the wheels' rolling axis. One of the pivot axis is spaced parallel at a constant separation to the wheel's rolling axis Moreover, the wheels occupy the same spatial positions and orientation relative to one another in both the folded and unfolded states of the golf cart. The golf cart will thusly roll on its wheels for ease of transport, or for service as a utility wheeled trolley, in both its folded and unfolded states. Both the cart's handle and its two wheels are normally detachable to accord further compactness of the folded cart.

DESCRIPTION OF THE PREFERRED EMBODIMENT

Figure 1A:
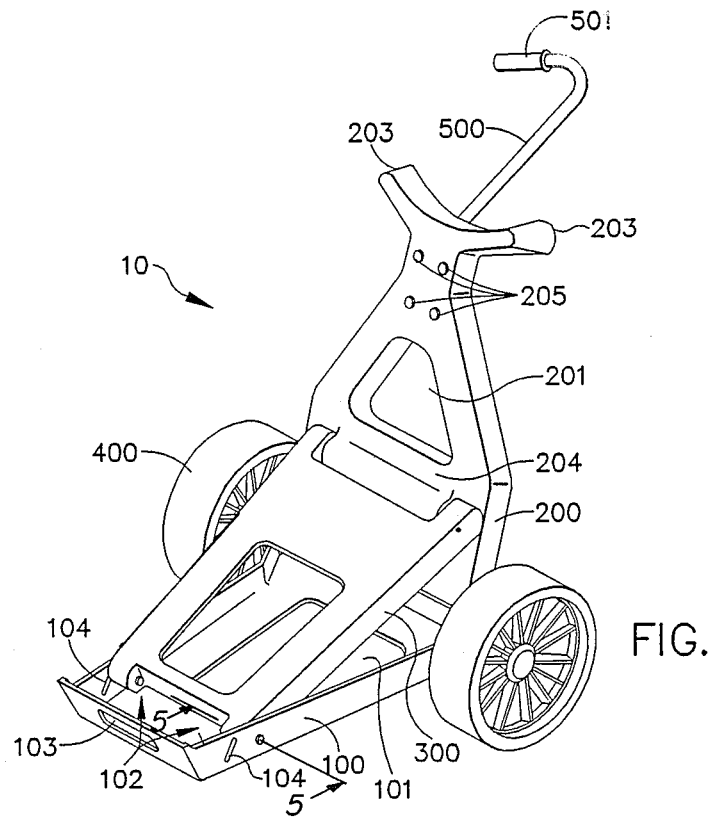
FIG. 1, consisting of FIG. 1a and FIG. 1b, are perspective views of the preferred embodiment of a folding golf, cart in accordance with the present invention in its unfolded and folded states.
Figure 1B:
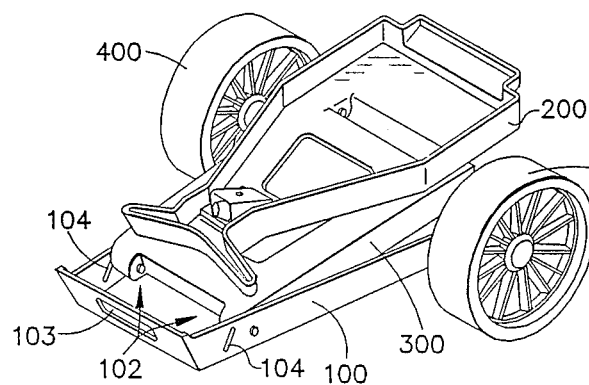

The preferred, foldable, embodiment of a golf cart in accordance with the present invention is shown in perspective view in FIG. 1. The foldable golf cart 10 includes base pan member 100, bag support member 200, and support leg member 300 serving as major structural members. The cart 10 also includes wheels 400 and handle 500. Each of the structural members 100, 200, 300 is substantially planar in the general shape of a rectangle, and more particularly in the general shape of a trapezoid. Other shapes, aspect ratios, and differing thicknesses of the members 100, 200, 300 are possible in accordance with the following explanation of their connections.

Each of the members 100, 200, 300 is preferably made of non-metallic, and more preferably of composite, material. The preferred composition of members 100, 200, 300 is fiberglass and graphite reinforced fibers in a matrix of polyester resin with coloring pigment as desired. The members 100, 200, 300 are preferably manufactured by molding. They exhibit variously textured surfaces, colors, and gloss as is aesthetically desired. Importantly, the members are corrosion resistant, durable, and lightweight. The members typically weigh approximately 1.1 lbs. (0.5 kg.) each, and the total weight of the golf cart 10 is typically 5 to 7 lbs. (1.86 to 3.17 kg.). The preferred embodiment of the foldable golf cart 10 of this weight is capable of reliably transporting a typical 45 lb. (16.8 kg.) golf bag over broad environmental conditions of $-30°$ F. to $+150°$ F. ($-34.4°$ C. to $+83.3°$ C.).

As may be most readily observed in FIG. 1, the base pan member has a coved, or channeled, construction. The member 100 presents a large central aperture 101 which is void of material for weight reduction The long base side of trapezoidally shaped base member 100 is typically 11.75", the short parallel side is typically 8.5", and each of the slanted sides is typically 20". The long base side of the trapezoidally shaped aperture 101 is typically 7.0", the short parallel side is typically 4.5", and each of the slanted sides is typically 10".

In a similar manner the bag support member 200 is also preferably of channeled, substantially thin walled, construction. The bag support member 200 exhibits a symmetrically disposed substantially central aperture 201. The bag support member 200 is substantially rectangular of typical dimensions 9"×10.25" in its lower region while the upper region is of complex, generally trapezoidal, shape. This upper region extends for about 13" and regionally narrows near screws 203 to approximately 3.25". The bag support member 200 may optionally integrally incorporate indicia, typically in the region 204 illustrated in FIG. 1. This indicia might, for example, read "GOLF BAG CART" or the trademark(s) or trade name(s) of the manufacturer or distributor, a golf club name, or any like message. The indicia typically located at area 204 is preferably embossed into the molded member 200. The indicia is normally raised above the surrounding s surface and is distinctively colored by a silk screen or hot stamping process.

Finally, the support leg member 300 is also preferably of channeled, substantially thin walled, construction. It is substantially trapezoidal in shape with a long base side typically 11", a short parallel side typically 8.5", and slanted sides each typically 17". Its trapezoidally shaped central aperture is typically of dimensions 7.0" base by 4.5" short side by two parallel sides of 9" each. The narrow end of trapezoidal base pan member 100 presents, in combination with support leg member 300, a dish-like receptacle area 102 that is capable of receiving and holding the butt end of golf bag (not shown). The aperture 103 allows water and contaminants which may accumulate in this area to be evacuated from the interior surface of base pan member 100 and receptacle area 102. The slots 104 allow for receipt of a strap (not shown) to surround and hold the base of the golf bag (not shown) which is mounted upon golf cart 10.

Figure 2:
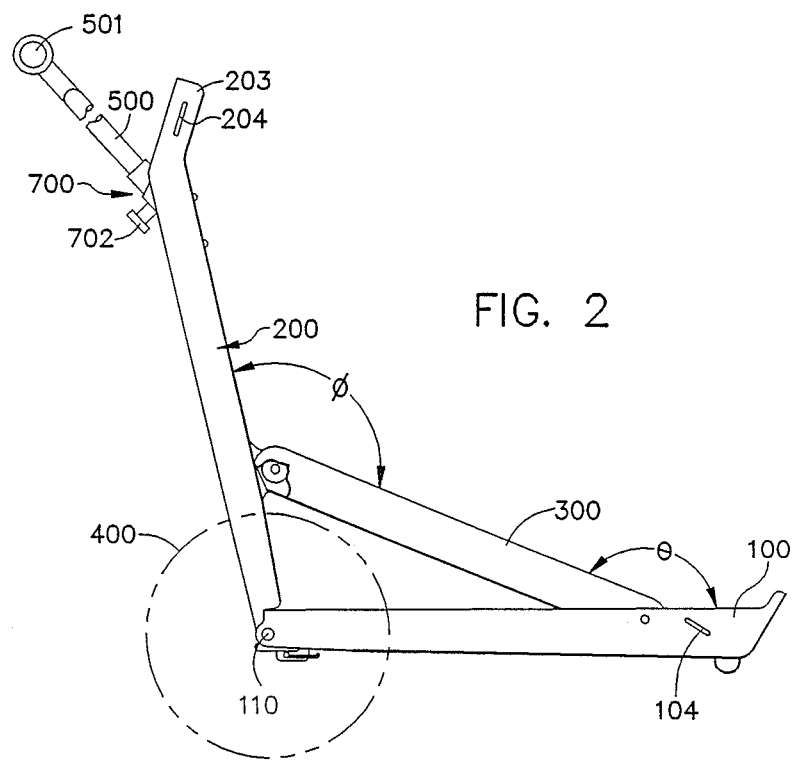
FIG. 2 is a side view, partially in cut away, of the preferred embodiment of the folding golf cart in the present invention in its unfolded, deployed, operational position.
Figure 3:
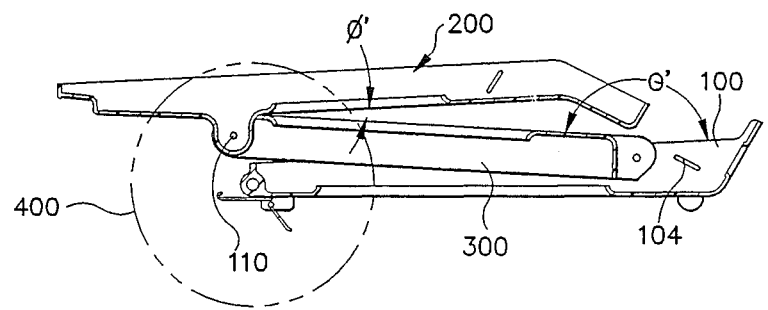
FIG. 3 is a side view, partially in cut away, of the preferred embodiment of a golf cart in accordance with the present invention in its folded, stowage, position.

As may be most clearly observed in the side view of FIGS. 2 and 3, wheels 400 are mounted proximate the long, base, edge of trapezoidal base pan member 100.

Figure 4:
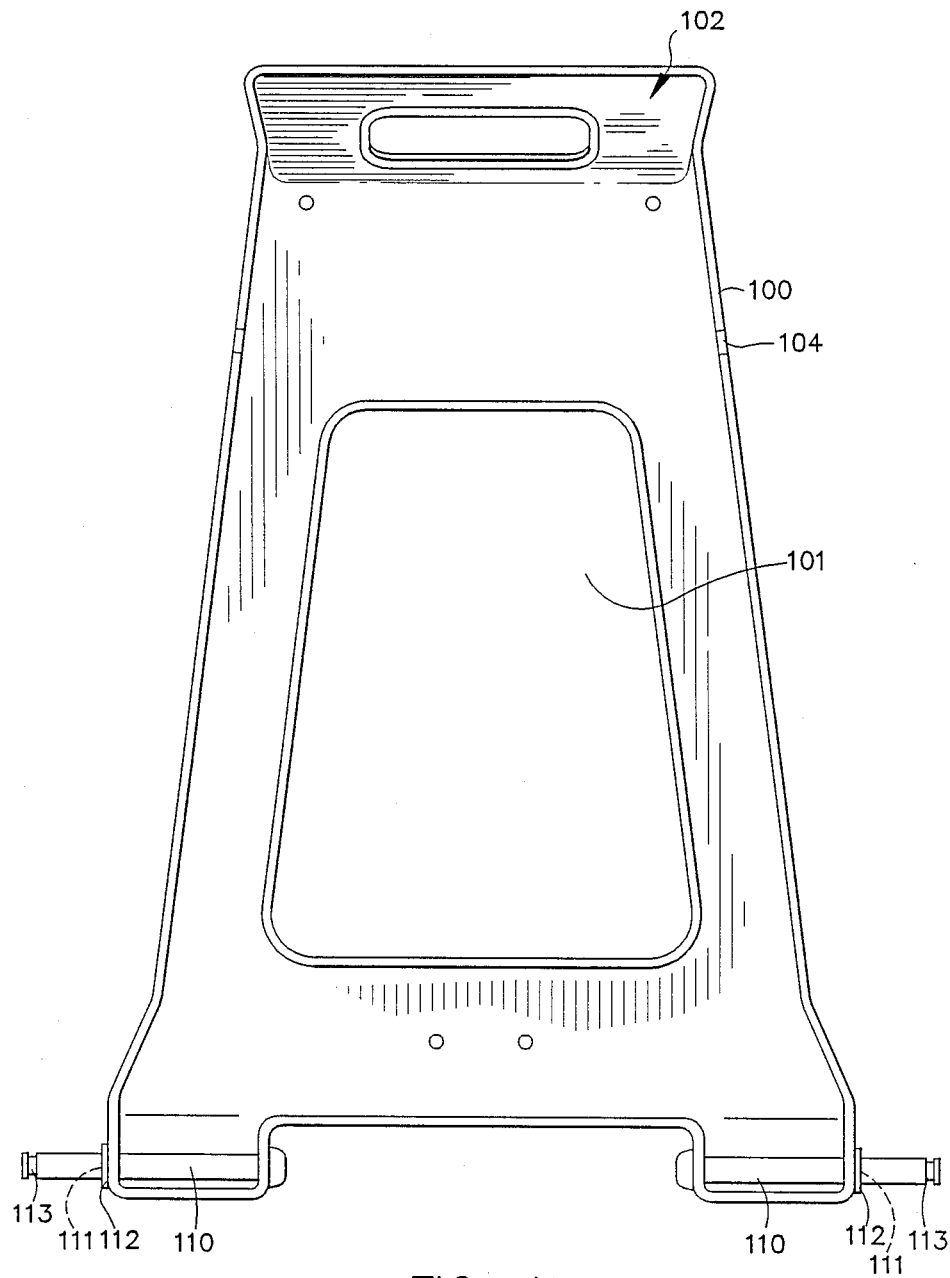
FIG. 4 is a detail view of the attachment of a wheel to the base pan member within the preferred embodiment of a folding golf cart in accordance with the present invention.

Although the wheels 400 could have been mounted to a single axle shaft, they are each preferably mounted to a metal axle pin 110 which mounts within the material of base pan member 100 as is shown in detail in FIG. 4. The metal axle pin 110 is typically 4.7" long by 0.30" diameter and is preferably made of corrosion resistant stainless steel or aluminum. It possesses a connector feature, typically an inner E-ring slot 111, by which it is securely retained, typically by E-ring 112, within base pan member 100. It preferably further possesses another connector feature, typically an outermost E-ring slot 113, by which the wheels 400 may be mounted, and dismounted, from the axle pin 110. The wheels 400 are typically die cast aluminum quick-disconnect wheels available from Browning Bag Boy Division, Portland, Ore.

Figure 5:
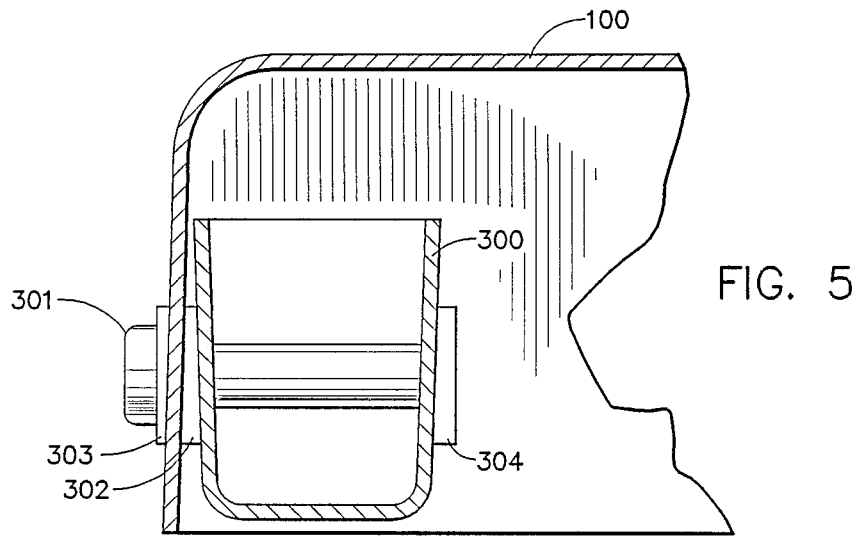
FIG. 5 is a cross-sectional view, taken along aspect line 5—5 shown in FIG. 1, of the channeled construction, and of the pivoting connection, of the structural members of the preferred embodiment of a folding golf cart in accordance with the present invention.

Continuing in FIGS. 1–3, the support leg member 300 spans between the base pan member 100 and the bag support member 200 so as to create a stable and rigid orientation between the members. The members 100, 200, 300 form a prism of triangular cross-section. Each triangular cross-section of this prism is in a plane substantially perpendicular to the rolling axis of the wheels 400. The axis of the prism is substantially parallel to the rolling axis of the wheels 400. The support leg member 200 pivotably attaches at two places to the base pan member 100 and at two places to the bag support member 200 by screws, washers, and nuts. A detailed view of this construction, taken along aspect line 5—5 shown in FIG. 1, is shown in FIG. 5. The base pan member 100 is pivotably connected to the support leg member 300 by a binder screw 301, typically size $\frac{1}{4}$-20 of stainless steel or other noncorroding metal. The members 100, 300 are maintained in separation by washer 302, typically nylon of $\frac{1}{4}$" interior diameter. The tip of the binder screw 301 fits through washer 303, typically corrosion resistant stainless steel of $\frac{1}{4}$" interior diameter. The tip of binder screw 301 screws into nut 304, typically a locking type of size $\frac{1}{4}$-20 made from corrosion resistant stainless steel.

Continuing in FIGS. 1 and 2, the bag support member 200 is further attached to base pan member 100 as well as to support leg member 200. This attachment is preferably both breakable and makable in order that the cart may be folded. However, the attachment of bag support member 200 to base pan member 100 needs not be capable of being disconnected to derive the advantages of a light weight golf cart constructed substantially of planar composite material members.

Figure 6:
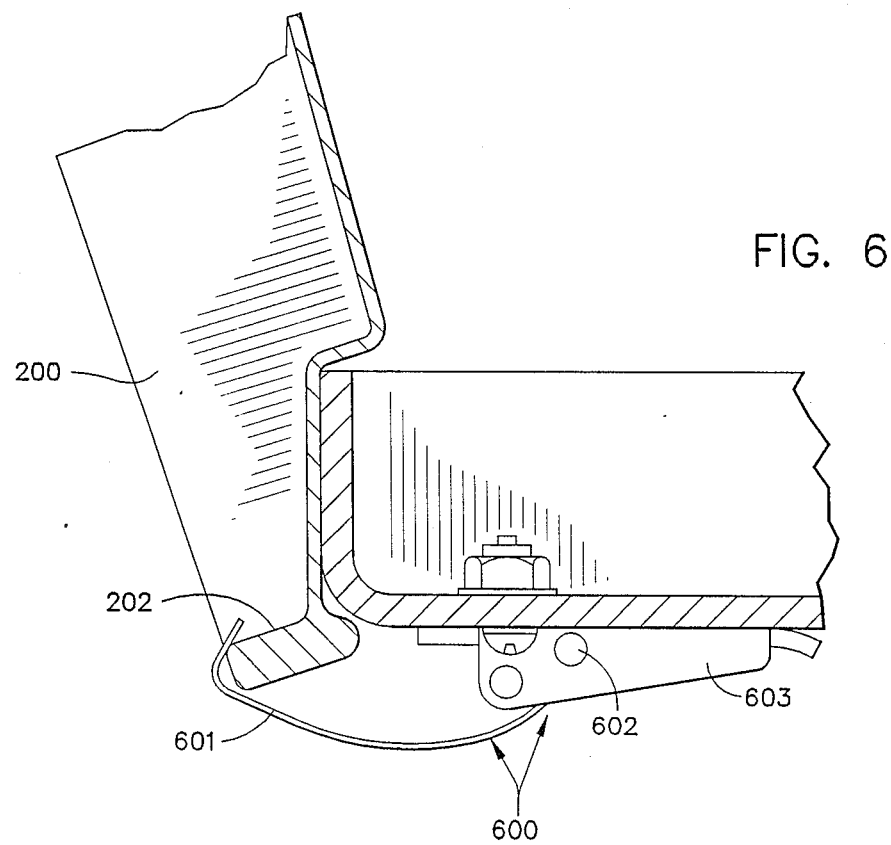
FIG. 6 is a cross-sectional detail view of the connection of the base pan member to the bag support member in the unfolded and deployed condition of the preferred embodiment of a folding golf cart in accordance with the present invention.

As may be observed in FIGS. 2 and 3, and in detail cross-sectional view in FIG. 6, the lower extremity of the bag support member 200 presents at its central region a flange, or lip, 202. This flange 202 mates with a complementary feature 105 at the central region of the long, base, edge to trapezoidal base pan member 100. A connection mechanism, typically a toggle latch 600, allows for the quick connection, and disconnection, of the lower edge of bag support member 200 to the rear edge of base pan member 100. The toggle latch 600, typically type TL100 available from DZHUS Manufacturing Company, employs a hooked member 601 that pivots about a pivot axis 602 and that is secured in position by pressure exerted against handle 603. The latch 600 is typically made of stainless steel. It may alternatively be zinc plated with a yellow chromic finish. It is substantially fool-proof in operation. It is reliable to attach bag support member 200 to base pan member 100. It is durable in extended use.

The bag support member 200 exhibits a substantially triangular central aperture 201. Above this aperture 201 is mounted a handle support assembly 700, best visible in FIG. 2. The handle support assembly 700 receives the handle 500 and retains it by operation of a thumb screw 702. The handle assembly will be shown in greater detail in FIG. 7a–7c. At the upper end of bag support member 200 are two bag cradle extensions 203. Each extension contains an aperture 204 (best visible in FIG. 2) which fits a strap (not shown) which surrounds the top of a golf bag (not shown) which may be mounted upon cart 10.

Figure 7A:
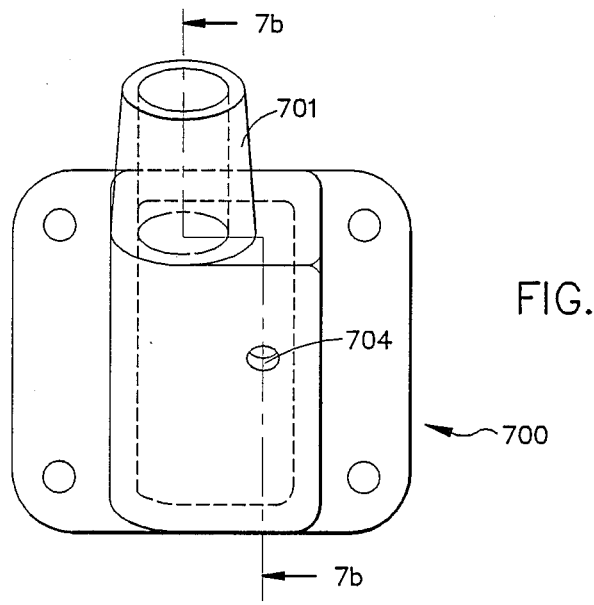
FIG. 7, consisting of FIG. 7a through 7d, show the manner by which the handle is removably affixed to the bag support member in the preferred embodiment of a folding golf cart in accordance with the present invention.
Figure 7B:
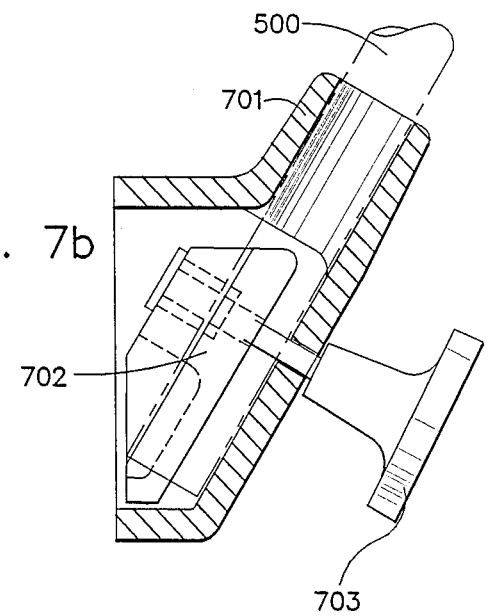
Figure 7C:
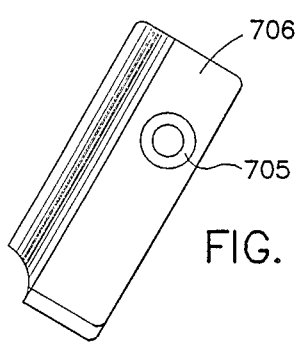
Figure 7D:
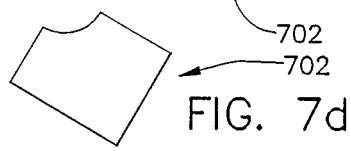

A front view of the handle support assembly 700 is shown in FIG. 7a, a side view of the same assembly 700 is shown in FIG. 7b, and a detail view of a floating retention piece 706 interior to the assembly 700 is respectively shown in side and end views in FIGS. 7c and 7d. The handle support assembly 700 is secured to bag support member 200 by four binder screws 205, typically of size $\frac{1}{4}$-20 corrosion resistant stainless steel, fitting through washers (not visible) that are typically $\frac{1}{4}$" internal diameter made of corrosion resistant stainless steel. The screws 203 thread into nuts (not visible), typically of the locking type size $\frac{1}{4}$-20 made from corrosion resistant stainless steel. The handle support 700 has an extended protruding region 701 of tubular shape which is of complementary interior diameter and shape so as to receive the proximal end of handle 500. The handle 500 is typically tubular of exterior diameter 0.75". The external diameter of the complementary feature 701 of handle support 700 that receives handle 500 is typically 1.25". When the handle 500 is inserted into the handle support 100 it passes proximate to the floating retention piece 702 and contacts it. The floating retention piece 702 is of the complex shape shown in respective side and end views in FIGS. 7c, 7d. This retention piece pivots within the body of handle support 700, as is most clearly shown in FIG. 7b, under force of thumb screw 703. The thumb screw 703 passes through aperture 704 of handle support 700 and engages captive insert nut 705 within floating assembly 702. The thumb screw, or knurled knob, 703 is typically of size $\frac{1}{4}$-20 and made from stainless steel or other corrosion resistent metal. It is received into the captive nut 705 within floating assembly 702 which is likewise typically of $\frac{1}{4}$" size and corrosion resistant. The floating assembly 702 itself is of high wear injection molded polypropylene, typically including 10% to 20% graphite fiber or chopped fiberglass. It presents broad wearing surfaces in its clenching of handle 500, and is accordingly not readily subject to significant deterioration or wear in reliably performing its handle attachment function The entire handle support assembly 700 is generally operative with only a modest force exerted through some thumb screw, or knurled knob, 703 so as to removably connect and disconnect handle 500 over tens of thousands of operative cycles extending across decades of time duration.

Returning to FIG. 1, the handle 500 is typically made from corrosion resistant steel or aluminum. It typically has a hook at its distal end, as illustrated, for ease of grasping during pushing or pulling of cart 10. It typically fits a grip 501, normally of plastic or rubber which is either tension fit or cast in place, at its distal end. The handle 500 is oriented through handle support assembly 700 at an angle of approximately 30° to the major plane of bag support member 200. In this position, and with the aspect ratio of members 100, 200, 300 as illustrated, the golf cart 10 with a typical golf bag (not shown) affixed thereto exhibits good, stable, balance during both rolling and sitting use.

Moreover, the golf cart 10 exhibits excellent rigidity. Rigidity of the frame comprised of members 100, 200, 300 is desired for precision positioning of the cart, absence of squeaks, and for imparting a feel of the fairway to the hand of the golfer pulling the cart 10. The members 100, 200, 300 form a prism of triangular cross-section, and more particularly of the cross-section of an obtuse triangle The rearward portion of base pan member 100 and the support leg member 300 constitute the long sides of the obtuse triangle while the lower portion of bag support member 200 constitutes the short side of the obtuse triangle.

In its preferred embodiment the golf cart 10 in accordance with the present invention is foldable. Particularly, as may be illustrated by comparison of FIGS. 1-3, the attachment of the lower edge of bag support member 200 to the rear edge of base pan member 100 via latch 600 may be disengaged. The lower portion of bag support member 200 pivots rearward (in the directional sense of FIG. 1) about its pivotal attachment to support leg member 300. Accordingly, the upper region of bag support member 200 tilts forward (again in the directional sense of FIG. 1) over the top of support leg member 300 as both members compress, in a "Z"-fold scissored, or jackknifed, manner toward the central cavity of base pan member 100. The angle between bag support member 200 and support leg member 300, identified by Greek letter "phi" in FIG. 2 and by "phi" prime in FIG. 3, becomes relatively more acute as the cart 10 is folded. The angle between base pan member 100 and support leg member 300, identified by Greek letter "theta" in FIG. 2 and by "theta" prime in FIG. 3, becomes relatively more obtuse as the cart 10 is folded.

The handle 500 is normally detached from bag support member 200, and the wheels 400 are optionally detached from base pan member 100. The handle 500 and wheels 400 may be separately stowed, or stowed in conjunction with the collapsed and folded structural members 100, 200, 300 of the cart 10, for transport and storage. The collapsed golf cart 100 exhibits substantially the size and aspect ratio of a small suitcase (even with wheels 400 still attached). It is approximately 16" wide by 26" long by 5" high with the wheels 400 removed. As such, it is conveniently transported and stored, especially in small automobiles and airplanes. Unfolding transpires oppositely from folding.

In accordance with the preceding discussion, certain obvious variations in the present invention will be suggested to a practitioner of the art of golf cart design. For example, it may be noted by reference to FIG. 1 that, from this Figure only, any identification as to which particular one (or both) of the base pan member 100 and the bag support member 200 attaches the wheels 400 is ambiguous. As previously explained, and as illustrated in FIG. 2, the wheels 400 typically attach to base pan member 100. However, this need not be the case. The entire foldable construction of the golf cart in accordance with the present invention could have been realized if the wheels were to be, alternatively, mounted to the bottom edge of bag support member 200. In such a case, the rear lip of base pan member 100 would engage and clasp, such as by latch connecter or by tension fit, a complementary feature, perhaps an aperture, at or near the bottom edge of bag support member 200.

In a similar manner, it could be envisioned that each of the structural members 100, 200, 300 could be geometrically shaped more substantially as rectangles or triangles rather than trapezoids. The members could be of substantially uniform thickness as opposed to exhibiting coved and/or channeled construction. The members could even be formed out of tubular elements as space frames.

From such obvious variations in construction, it will be realized that the present invention entails, amongst other aspects, a geometry of golf cart construction which is particularly supportive of implementation with light weight, planar, composite materials, typically fiberglass material Moreover, the golf cart in accordance with the present invention is preferably foldable. Therefore, the present invention should be interpreted in accordance with the language of the following claims, only, and not solely in accordance with that preferred embodiment within which the invention has been taught.

What is claimed is:

1. A folding golf cart comprising:
   wheels;
   a substantially planar rigid base pan member, operatively deployed during rolling and resting of the golf cart in a relatively horizontal position proximate the ground, that (i) rotatably mounts the wheels at two opposite edges at positions proximate a first side, and (ii) presents a receptacle area proximate an opposite, second, side that is capable of receiving and retaining the base of a golf bag;
   a substantially planar rigid bag support member, operatively deployed during rolling and resting of the golf cart in a relatively vertical position, that (i) extends upwards from a detachable attachment near the first side of the base pan member, and (ii) presents opposite the attachment a bag cradle area capable of receiving and retaining an upper region of the golf bag; and
   a substantially planar rigid support leg member extending between a first pivotable connection to the base pan member proximate its second side and a second pivotable connection to the bag support member intermediate its attachment and its opposite bag cradle area;
   wherein the base pan member, bag support member, and support leg member define a prism of triangular cross-section when the golf cart is unfolded;
   wherein the bag support member detaches from its attachment to the base pan member's first side while its bag cradle area pivots about the second pivotable connection towards the base pan member's receptacle area meanwhile that the support leg member pivots about its first pivotable connection so as to bring its second pivotable connection towards the base pan member's first side in order to fold the golf cart; and
   wherein the folded golf cart assumes in cross section the shape of the letter "Z" with (i) the bag support member in its portion between its bag cradle area and its intermediary pivotable connection to the support leg member forming one leg of the "Z", (ii) the support leg member between its first and its second pivotable connections forming the slant leg of the "Z", and (iii) the base pan member in its portion between its first pivotable connection to the support leg member and its first side forming the final leg of the "Z".

2. The golf cart according to claim 1
wherein the attachment of the bag support member to the base pan member is selectively engageable and disengageable without use of tools.

3. The golf cart according to claim 1
wherein the planar base pan member is substantially trapezoidal in shape having its first side substantially as the base of the trapezoid; and
wherein the planar bag support member is substantially trapezoidal in shape having its detachable attachment to the base pan member substantially as the base of the trapezoid.

4. The golf cart according to claim 1
wherein the base pan member, the bag support member, and the support leg member are made substantially from non-metallic material.

5. The golf cart according to claim 4 further comprising
means for removeably mounting the wheels to the base pan member.

6. The golf cart according to claim 5 wherein the means for removeably mounting the wheels is quick disconnect.

7. The golf cart according to claim 4
wherein the base pan member, the bag support member, and the support leg member are made at least partially from fiber-reinforced plastic material.

8. The golf according to claim 7 wherein the fiber-reinforced plastic material comprises:
fiberglass in a plastic resin.

9. The golf according to claim 4 further comprising:
a handle detachably mounted to the bag support member.

10. A golf cart comprising:
wheels;
a substantially planar base pan member, operatively deployed during rolling and resting of the golf cart in a relatively horizontal position proximate the ground, that (i) rotatably mounts the wheels at two opposite edges at positions proximate a first side, and (ii) presents a receptacle area proximate the opposite, second, side that is capable of receiving and retaining the base of a golf bag;
a substantially planar bag support member, operatively deployed during rolling and resting of the golf cart in a relatively vertical position, that (i) extends upwards from an attachment near the first side of the base pan member, and (ii) presents opposite the attachment a bag cradle area capable of receiving and retaining an upper region of the golf bag;
a substantially planar support leg member extending between the base pan member and the bag support member and connecting to each;
a handle;
an apertured handle support assembly affixed to the bag support member and receiving the handle within its aperture;
a moveable assembly retained within the aperture of the handle support assembly for selectively clenching the handle; and
clenching actuation means for selectively causing the moveable assembly to clench the received handle in order that it may be selectively attached and detached from the golf cart;
wherein the base pan member, bag support member, and support leg member define a prism of triangular cross-section.

11. A foldable golf cart comprising:
three substantially planar members aligned and interconnected so as to form a prism of triangular cross-section, a first member's first edge removably connected to a second member's first edge, and a third member spanning between the first and second members;
wheels mounted to the interconnected members substantially at and along the axis formed by the first edge removable connection of the first and second members; and
a handle connected to the second member;
wherein the first edge of the second member may be disconnected from the first edge of the first member while the second member pivots in its connection to the third member while the third member pivots in its connection to the first member so that, in combination, the members fold towards one another, collapsing the golf cart so that it assumes a "Z" fold in cross-section with the third member constituting the cross leg of the "Z".

12. A foldable golf cart comprising:
wheels;
a first substantially planar substantially trapezoidal base member (i) rotatably mounting the wheels near opposite ends of its long end edge, (ii) presenting a region capable of receiving and retaining the base of a golf bag near its short end edge, and (iii) presenting connection points upon each its sides near its short end edge;
a second substantially planar substantially trapezoidal strut member (i) presenting first connection points upon each side edge near its short end edge which connection points engage the corresponding connection points of the first member so that the second member may pivot about the first member, and (iii) presenting second connection points near each end of its long end edge; and
a third substantially planar support member (i) presenting substantially central connection points which engage the corresponding second connection points of the second member so that the support member may pivot relative to the second member, and (ii) presenting a region engaging the long end edge of the first member;
wherein the golf cart may be folded by pivoting the second member flat to the first member along the short end edge pivot axis of the first member; and
wherein the golf cart may be stably erected by pivoting the third member in extension from the second member along the long end edge pivot axis of the second member until the engagement region of the third member engages the first member, forming therefore a prism of obtuse triangular cross-section having the first member and the second member lying along long sides of the obtuse triangle and having the third member along a short side of the obtuse triangle.

13. A method of folding a foldable golf cart having three substantially planar rigid members that, in the unfolded position, define a prism of triangular cross-section, the method comprising:
maintaining a substantially planar substantially horizontal rigid base member and two wheels rotatably mounted thereto in a fixed relationship;
first pivoting a substantially planar rigid strut member connecting on one edge at an acute angle to the base member about a pivot axis of this connection in the direction of and so as to assume an even more acute angle with the base member; this first pivoting being permitted by and simultaneous with second pivoting a substantially planar rigid support member from a substantially vertical position where its one edge connects at an obtuse angle to an edge of the base member about a pivot axis formed by its connection with a remaining edge of the strut member in a direction so that the support member's one edge swings away from the strut member and so that an extension of the support member opposite to its one edge from its pivot axis comes to align at an acute angle to the strut member;

wherein the support, strut, and base members assume the triangular cross section of the prism in the unfolded position of the golf cart, the extension of the support member being an extension to one side of the triangular prism beyond the enclosed area of the prism;

wherein the support, strut, and base members assume a "Z" cross-section in the folded position of the golf cart, the cross-section of the extension of the support member now being an end leg of the "Z" while that portion of the support member which was initially, in the unfolded position of the golf cart, a side of the triangular prism now being in cross-section an extension to this end leg of the "Z" beyond its intersection with the slant leg of the "Z".

14. A folding golf cart frame comprising:

a first, a second, and a third substantially planar rigid member aligned and interconnected to one another (i) so as to form upon such times as the cart frame is unfolded a structure having a cross-section substantially in the shape of a capital letter "A", where the first member, the second member, and the third member respectively constitute a "/" first segment, a "\" second segment, and a "—" third segment of the "A" and (ii) so as to form upon such times as the cart frame is folded a structure having a cross-section substantially in the shape of the capital letter "Z", where part of the first member, part of the second member, and all of the third member now respectively constitute a "_" first segment, a "—" second segment, and a "/" third segment of the "Z".

15. The folding golf cart frame according to claim 14 wherein because the segments of a "Z" are not necessarily of equal length to the segments of an "A", and vice versa, only part of the first member, this part constituting a segment-portion "/" of the "/" first segment of the "A", is used as the first segment "$_{13}$" of the "Z"; and wherein only part of the second member, this part constituting a segment-portion "\" of the "\" second segment of the "A", is used as the second segment "—" of the "Z"; and wherein the remaining parts of both the first and the third members are still rigidly integral to these members but are simply outside the region whereat the folded golf cart forms, in cross-section, the "Z".

16. The folding golf cart frame according to claim 14 wherein the first member constituting the first segment "/" of the "A" is detachably attached to the second member constituting the second segment "\" of the "A" in the unfolded condition of the golf cart; and wherein the same first member constituting the first segment "_" of the "Z" is detached from the same second member constituting the second segment "—" of the "Z" in the folded condition of the golf cart.

17. The folding golf cart frame according to claim 14 wherein the first member, constituting the segment "/" of the "A" and the segment "_" of the "Z", is pivotably hinged to the third member, constituting the segment "-" of the "A" and the segment "/" of the "Z", in both the unfolded golf cart frame of cross-section "A" and in the folded golf cart frame of the cross-section "Z"; and wherein the second member, constituting the segment " " of the "A" and the segment "—" of the "Z", is pivotably hinged to the third member, constituting the segment "—" of the "A" and the segment "/" of the "Z", in both the unfolded golf cart frame of cross-section "A" and in the folded golf cart frame of cross-section "A".

* * * * *